United States Patent [19]

Seroskie

[11] 4,340,888
[45] Jul. 20, 1982

[54] SCAN LINERIZATION METHOD AND DEVICE

[75] Inventor: James M. Seroskie, Orlando, Fla.

[73] Assignee: Martin Marietta Corporation, Orlando, Fla.

[21] Appl. No.: 136,223

[22] Filed: Apr. 1, 1980

[51] Int. Cl.³ .............................................. G09G 3/00
[52] U.S. Cl. .................................. 340/755; 340/721; 340/749; 358/113; 358/208
[58] Field of Search ............... 340/749, 805, 755, 723, 340/721, 748, 744; 358/113, 208

[56] References Cited

U.S. PATENT DOCUMENTS

| | | | |
|---|---|---|---|
| 3,704,342 | 11/1972 | Stoddard et al. | 358/208 |
| 3,809,976 | 4/1974 | Gard | 358/113 |
| 3,846,784 | 11/1974 | Sinclair | 340/755 |
| 4,129,887 | 12/1978 | Michon | 358/113 |
| 4,189,747 | 2/1980 | Funari | 358/113 |
| 4,213,146 | 7/1980 | Maiman | 358/208 |

Primary Examiner—Marshall M. Curtis

Attorney, Agent, or Firm—Julian C. Renfro; Gay Chin; Macdonald J. Wiggins

[57] ABSTRACT

A scan linearization device for use in a system that produces graphic images by means of nonlinear scanning elements which produce a multiplicity of scanning lines by scanning an array of emitters. The device introduces externally generated digitally coded signals representative of a desired image by quantizing a scanning line into a discrete number of periods and energizing appropriate emitters during each of such periods. An electrical scan waveform is picked off from the scanning elements and contains the nonlinearities. A staircase waveform is generated having equal amplitude steps and is compared to the scan waveform. When the amplitude of the scan waveform exceeds the amplitude of a step, the next step is generated resulting in a nonuniform temporal spacing of the amplitude steps complementary to the nonlinearities of the scan. The emitters are sequentially energized by each step such that the scan nonlinearities are compensated and an undistorted graphic image is produced.

12 Claims, 6 Drawing Figures

SCAN LINERIZATION METHOD AND DEVICE

BACKGROUND OF THE INVENTION

1. Field of the Invention

The invention relates to a scan linearization device, and more particularly to a device for introducing external electrical excitation representing images into a nonlinear scanning system which transforms incoming radiant energy into a visible real time image so as to produce undistorted visible images.

2. Description of the Prior Art

A number of systems have been developed which permit night viewing of objects, terrain and the like. Such systems have many applications, including military use for permitting operators of aircraft, artillery, and other weapons systems to obtain visible images of targets in the dark. Such systems generally utilize an optical system which collects radiant energy in the infrared region and converts such energy to a visible image in real time. The present invention is an accessory for use with a night imaging system in which the optical system utilizes scanning which is inherently nonlinear and in which the nonlinearities involved in the radiant energy conversion system are compensated so as to produce a linear visible image. In this night imaging system, it is necessary to produce symbols and other images to be superimposed on the visible image by means of external circuits. The system scanning mechanism which scans the radiant energy to produce visible images unfortunately produces various types of distortion in such externally introduced symbols and images.

For a better understanding of the present invention and the description provided hereinafter, U.S. Pat. No. 3,781,559 issued to Cooper, et al and assigned to Texas Instruments, Incorporated, is hereby incorporated by reference. This patent, entitled "Variable Field of View Scanning System", describes the device to which the present invention is particularly applicable.

The invention described in the referenced patent is a system which transforms incoming infrared radiant energy into a visible real time image. In particular, the device is concerned with producing images having different fields of view, and uses scanning mirrors and an afocal optical section to vary the field of view as required. The afocal section accepts incoming collimated radiant energy to produce exiting collimated energy having a different beam diameter to change the field of view of the system without modifying the basic scanning optics. The collimated radiant energy is caused to scan onto a plurality of detectors in a vertical line. The output of the detectors modulates a vertical array of light emitters to produce a visible image. The image may be viewed directly or a television vidicon may be focused on the scanned image to produce a video signal available for driving a television display which may produce a remote visible image of the incoming radiant energy. As described in more detail in the referenced patent, the scanning system involves a number of moveable lenses and mirrors used in the scanning process and in the desired variable field of view. Nonlinearities in the scanning process may be caused by play in mechanical parts, mechanical jitter, and in the scan control circuitry.

SUMMARY OF THE INVENTION

In many applications of the system for producing a visible image from IR energy referenced above, it is required to superimpose on the visible image various symbology and other images. For example, it may be necessary to mark certain points or areas on the image such as centers of interest, target aiming points, or areas to be further investigated. Characters such as Xs, zeros, and the like are useful for such purposes and boxes may be generated to enclose selected areas. In accordance with the present invention, such superimposed images are introduced to the system by externally exciting an array of light emitters in a sequence synchronized with the scanning process of the imaging system. Although such external excitation may be in the form of an analog signal in which the intensity of the excited emitters may vary with the amplitude of exciting signal, in military applications it is more common to cause an emitter to be either fully on or fully off from the externally generated excitation. The present invention, therefore utilizes digitally coded signals representative of the desired symbology for excitation of the light emitters.

An electrical signal proportional to the position of the scanning elements is generated by a pickoff and is divided into a selected number of horizontal image line elements with the number of such elements selected in accordance with the resolution desired. Image defining signals are generated by a function generator preprogrammed for the various required symbols which may be externally selected by the user. A serial code block is generated in the form of a sequence of ones and zeros for each of the horizontal elements. The code block for a given element is fed into a storage register at a very high speed relative to the scan rate. Thereafter, the binary bits of the code block which are equal in number to the number of light emitters, are fed to the light emitters in parallel, thus producing a vertical column having the emitters illuminated in accordance with that portion of the desired symbology. The illumination of the column of emitters is synchronized with the scanning by use of the scanning waveform from the pickoff device. Thus, the scanning of a frame will result in the externally introduced image appearing superimposed on the image due to the incoming infrared energy.

In the scanning elements of the system of the referenced patent, inherent nonlinearities occur due to play in the mechanical parts thereof, mechanical jitter and from other undesirable sources. Due to the design of the system, such irregularities do not affect the reproduction of the visible image from the IR energy input. However, these nonlinearities and irregularities produce jitter and distortion in the externally generated symbology if the discrete vertical elements thereof were to be uniformly introduced during a horizontal scan period. To overcome this problem, the present invention advantageously utilizes a novel scan generated threshold circuit. The electrical scanning signal from the pickoff which will have the undesired nonlinearities and irregularities reflected in its instantaneous amplitude is compared in a comparator to a staircase waveform generated by an up counter. The staircase waveform has equal amplitude steps and a step is generated each time the scan signal is equal to the previous step. As may be recognized, the time period between steps will represent the duration of each successive horizontal element. The number of steps is, of course, equal to the selected number of such horizontal elements. The exact time at which the next step in a sequence occurs is a function of the irregularity in the scan signals. For example, if the scan were perfectly linear, all of the horizontal elements would be of equal duration. However, as in the actual situation, fine grain departures from linearity will cause the step threshold to be crossed either early or later than for the linear case.

Each stairstep is also used to clock the storage register to read out the stored symbology code group to the light emitters. As may now be seen, the nonlinear readout times will exactly compensate for the nonlinearities in the scanning system of the imaging device and will therefore result in the externally generated images being clear, sharp, and without distortion.

It is therefore a principal object of the invention to provide a device for entering external symbology into an IR imaging system for superposition on the visible image produced from IR energy.

It is another object of the invention to provide a device in which nonlinearities and irregularities in the scanning process of the imaging system are compensated for in the introduction of external symbology.

It is still another object of the invention to provide a device for introducing external images in the referenced system in digital form, and to divide the scanning interval into a number of horizontal scanning elements.

It is another object of the invention to provide a variable threshold from an electrical signal representative of the mechanical scan of a frame of the image.

It is a further object of the invention to produce a step function waveform from such threshold having equal step heights and variable step durations, such durations representative of one of the horizontal elements.

It is yet a further object of the invention to utilize the variable duration stairstep waveform to control the entering of binary code blocks into an array of light emitters utilized in the referenced imaging system at the exact time to compensate for nonlinearities and irregularities in the scanning process.

These and other objects and advantages of the present invention may be understood from the following detailed description when read in view of the drawings.

DETAILED DESCRIPTION OF THE PREFERRED EMBODIMENT

Figure 1:
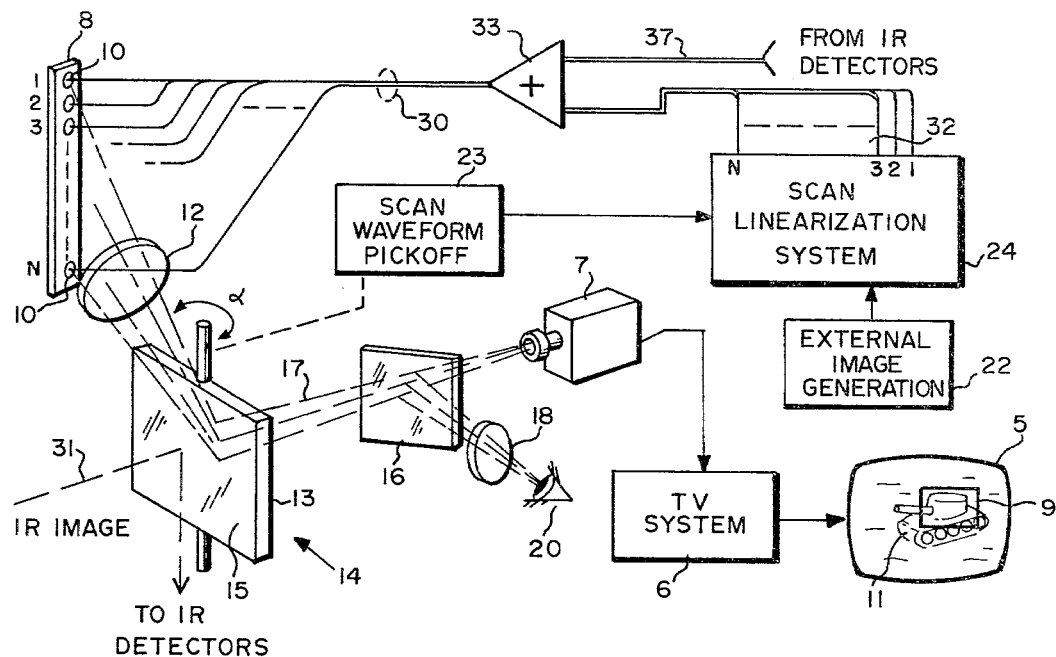
FIG. 1 is a functional block diagram of a simplified portion of the imaging system of the referenced patent showing the elements and connections of the present invention into that system.

Referring to FIG. 1, a simplified diagram of a portion of the visible real time image system described in the referenced patent to Cooper, et al is shown with the device of the present invention connected thereto. The night imaging system includes an oscillating scanning mirror shown generally at 14. Mirror 14 is rotated for an angular distance of which may be, for example, 7.5°. As explained in detail in the referenced patent, an infrared (IR) image is scanned through a lens system by surface 15 of mirror 14. As the incident radiant energy, shown schematically as beam 31, falls on the mirror surface 15, it is reflected to a group of IR detectors as indicated. Although not shown in the figure, the IR detectors are assumed to be disposed in a vertical array of N detectors. A vertical array 8 of light emitting diodes (LEDs) 10 is provided with a total of N LEDs. Each LED is driven from a corresponding IR detector via suitable amplifiers such that the amount of light emitted from an LED 10 is proportional to the intensity of the detected IR radiation. Connections for driving array 8 are shown schematically as cables 30 and 37 where it is to be understood that individual leads are provided for each of the LEDs in array 8. The light pattern produced by vertical array 8 in any instant represents a vertical column element of the field of the scanned IR image translated into visible light. As mirror surface 15 scans the IR image, it may be understood that the light pattern of LED array 8 will change with the angle of the surface 15 (and surface 13).

Figure 2:
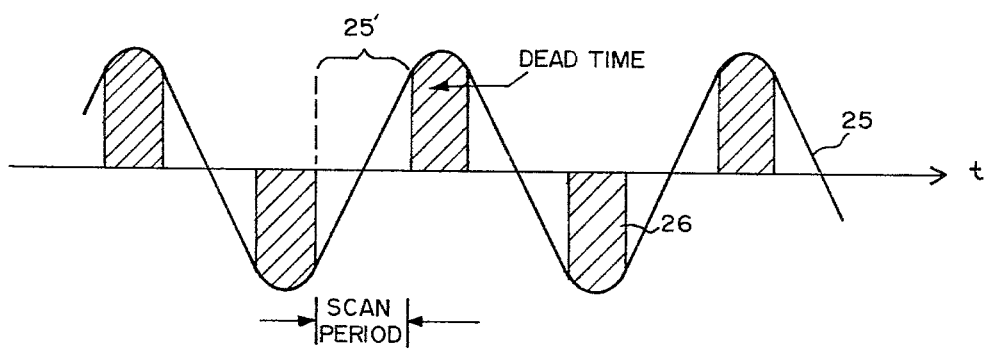
FIG. 2 is an idealized waveform diagram representative of both the mechanical scanning of the system of FIG. 1 and of the electrical waveform produced by a pickoff device of the present invention.

To recover the total image, the opposite surface 13 of mirror 14 is also operative as a scanning surface with the visible light pattern from LED array 8 focused thereon by lens element 12. The reflected visible light from mirror surface 13 may be focused on beam splitter 16 and reflected through a lens system 18 to produce a visible image as indicated schematically by eye 20. As the mirror surfaces 15 and 13 scan, a rectangular frame will be generated in the eye 20, due to the persistence of vision thereof, as defined by the changing light pattern of LED array 8 during a scanning period. The waveform 25 of FIG. 2 illustrates the scanning movement of mirror 14 for about 2½ scan periods. Referring to scan period 25', the motion of mirror 14 is controlled to produce a relatively linear movement during such period. As the mirror rotates to the limit of its scan, for example, from left to right, a "dead time" is produced as the mirror changes its direction of rotation to thereafter produce a right to left scan period, indicated by the following scan period with opposite slope.

The scanning of the visible light emitters in LED array 8 can also produce a visible image via a television system. For example, as shown in FIG. 1, a TV camera 7 may pick up the image from beam splitter 16 to produce a video signal for TV system 6 to be displayed on TV screen 5 in conventional fashion. A standard commercial television scanning system may be utilized as long as the TV scan rate and the mirror 14 scan rate are compatible. Where the TV system is used, improved resolution may be obtained by shifting mirror 14 during alternate scan periods so as to provide an interlace between alternate frames.

Figure 3:
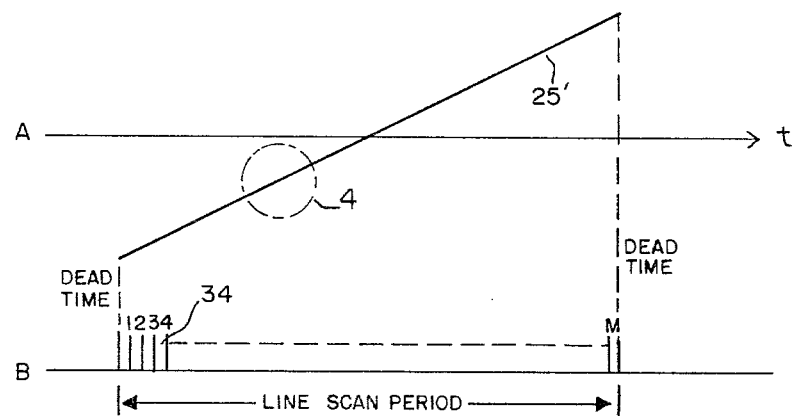
FIG. 3 is an enlarged view of one left to right scan period of the waveform of FIG. 2 to illustrate the production of a multiplicity of discrete horizontal elements as utilized in the present invention.

Having briefly described the operation of the prior art visible image device, the application of external symbology and images in accordance with the present invention will be described. An existing scan waveform pickoff device 23 coupled to mirror 14 generates an electrical waveform representative of the scan and which will have the waveform 25 as shown in FIG. 2. A multiplicity of selectable images generated by suitable waveform generators are available from external image generator 22. Examples of such images are: alphanumeric characters; circles; straight lines; and boxes. An example may be seen with reference to TV display 5. In this example, a visible image of a tank 11 has been reproduced on screen 5 from its infrared radiation. For use in directing fire against tank 11, a box 9 may be desired to be superimposed to outline a specific target area of tank 11. Similarly, small areas of interest in the display may be shown by circles Xs, or other symbols or characters. To produce such symbology, the waveform from external image generator 22 is applied via a scan linearization system 24 to the appropriate LEDs 10 in vertical array 8. Thus, a connection from scan linearization system 24 is provided to each LED 10 by leads 32 in which leads 1 through N are indicated through summer 33 which is considered to include the existing video amplifiers. By using these amplifiers to sum the symbol signals with the normal infrared image video, symbols can be superimposed on the IR image. In exciting LEDs 10, the scan time 25' is broken into a number of discrete periods. As indicated in FIG. 3, scan 25' on line A is broken into M elements 34 as shown on line B. The number of such elements 34 is selected to provide a desired resolution. It has been found, for example, that 240 elements 34 is sufficient to reproduce the symbols and images for a preferred embodiment. Scan linearization system 24 is synchronized to scan 25 from the scan waveform pickoff 23 to produce 240 light patterns on vertical array 8 during a single scan.

Figure 4:
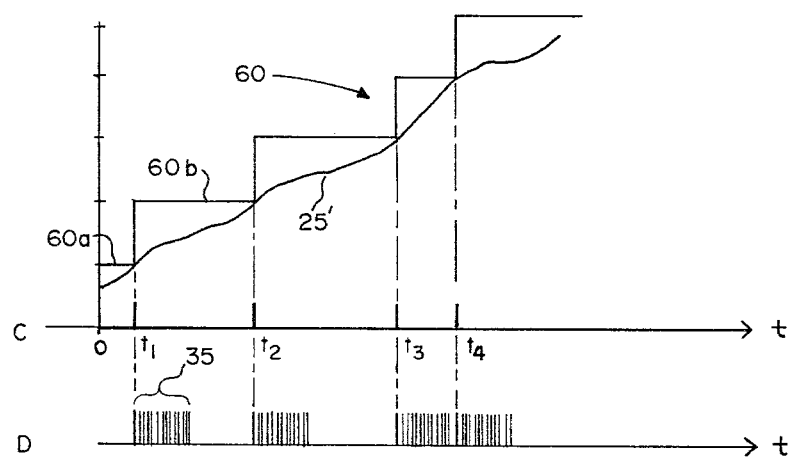
FIG. 4 is an enlarged fine grain view of the scan waveform of FIG. 3 showing the irregularities and nonlinearities thereof and illustrating the use of such waveform as a threshold for storing blocks of image data.

An inherent problem in the visible image system in the referenced patent is that the movement of mirror 14 is not perfectly linear and a significant amount of jitter has been found to occur during a scan. For example, FIG. 4 is an enlarged view of the area 4 of FIG. 3 showing a typical variation in scan 25' reflected into waveform 25 from pickoff 23. These nonlinearities and irregularities due to mirror 14 do not affect the quality of the visible image produced since the effects on the IR image beam 31 and the visible beam 17 are complementary and the irregularities cancel out. If line scan 25' were broken into N equal elements 34, it may be recognized that the superimposed external image would be distorted from the jitter and nonlinearities of scan 25'.

Advantageously, the device of this invention automatically compensates for nonlinearities and jitter of scan 25' and therefore produces superimposed images that are sharply focused and with minimum distortion. The basic circuit for the invention is shown in functional block diagram form in FIG. 5 and will be explained with reference to FIG. 4. It is necessary to cause the LEDs 10 in vertical array 8 to be illuminated in a certain pattern for each of the 240 periods. The intensity of illumination of LEDs 10 may be controlled to produce images having degrees of shading, or to be either fully on or fully off to produce solid line images. In the application for the preferred embodiment, solid line symbology is required; therefore the external control signals may be considered as having only two levels representing off and on conditions. External image generator 22 produces serial sequences of 120 on-off signal levels representative of the symbol selected. Thus, these data may be considered as a logic sequence of ONEs and ZEROs, to control each of the LEDs 10 where an LED is fully illuminated for a ONE and is off for a ZERO. The serial data block for a particular column element 34 is read into shift register 40 via lead 51. As may be understood, the rate at which a data block is read into shift register 40 is selected based on the duration of a single scan and the number of vertical column elements 34 selected. For example, with a scan rate of 40 Hz, and 240 vertical column elements 34, a data clock rate on lead 52 of 5 MHz is suitable. The read in of data blocks is indicated diagramatically in FIG. 4, line D by block 35. Shift register 40 (FIG. 5) has 120 outputs which are fed via leads 53 to storage register 42 which acts as a latching device to hold each of the 120 data bits in parallel. A data clock operating at a suitable rate thus controls the read in of the serial data blocks into shift register 40. Scan signal 25' of FIG. 4 is applied to comparator 44 via lead 50. The output of comparator 44 is connected to up counter 46 which is an 8 bit counter producing a binary count on leads 49 and will count from 0 to 239 as it is clocked by signals on lead 47. The binary code appearing on leads 49 is fed to digital-to-analog converter 48 which produces an analog voltage on lead 56 proportional to the count in counter 46. Thus, as counter 46 counts from 0 to 239, the output on lead 56 will be a staircase-type waveform and which will be reset by the scan direction signal on lead 69 after the last count is reached.

Figure 5:
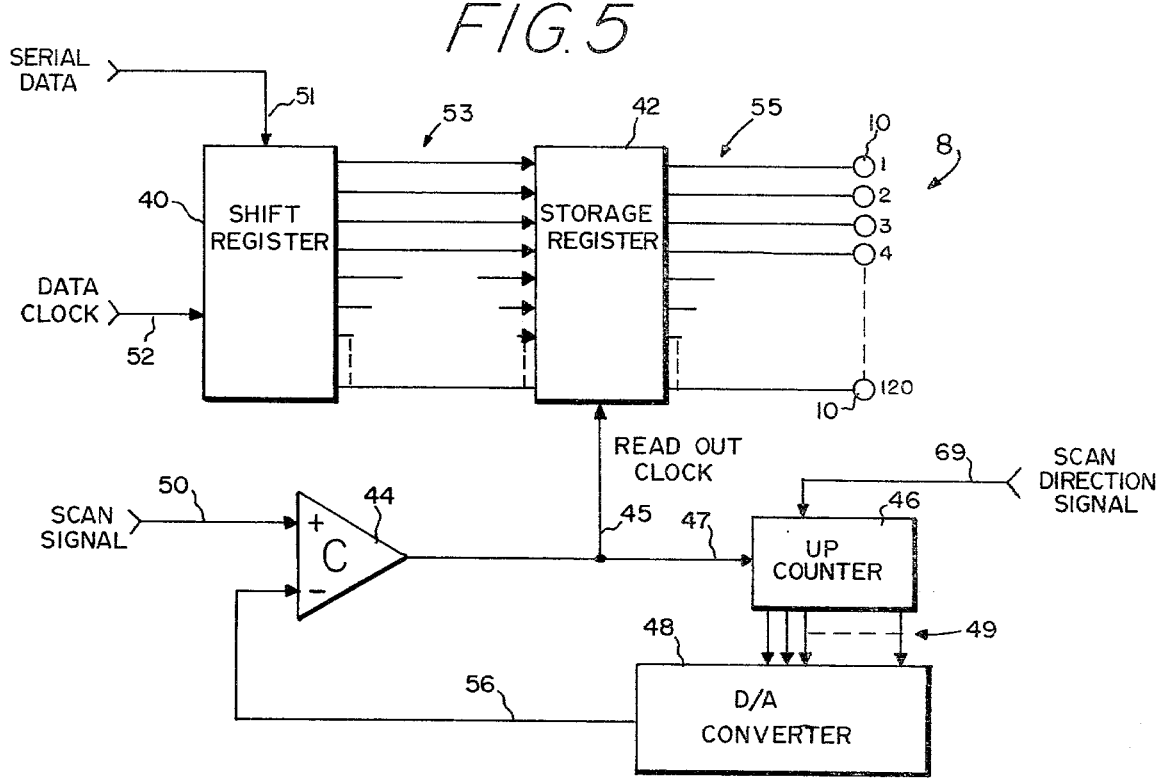
FIG. 5 is a functional block diagram of the scan linearization circuits of the present invention.

Referring to FIG. 4, on line C at t=0, line scan 25' has a lower amplitude than staircase waveform 60a which appears on lead 56 of FIG. 5. Therefore, no output will occur from comparator 44 on lead 47. However, as waveform 25' increases, it exceeds staircase waveform 60a at time $t_1$, causing a logic ONE to appear on lead 47. This level increments counter 46 by one count causing staircase 60 to step up to level 60b and lead 47 changes to a ZERO level. As may now be recognized, staircase 60 represents a continually increasing threshold which, when crossed by scan 25', will produce a ONE on lead 47 and also on lead 45 to storage register 42. A logic ONE on lead 45 represents a readout clock pulse for storage register 42 causing the stored data pulses to be read out in parallel to LEDs 10, numbers 1 through 120. After the data in storage register 42 is read out to array 8, the next data block for the next vertical column is read into shift register 40, and as noted from FIG. 4, will be read out at time $t_2$.

The effect of the above described sequence of events is to cause the vertical columns to be sequentially illuminated in a manner to compensate for irregularities and distortions in the scanning action of mirror 14 whereby the reproduced image seen by camera 7 or eye 20 will be linear and with minimum distortion.

Figure 6:
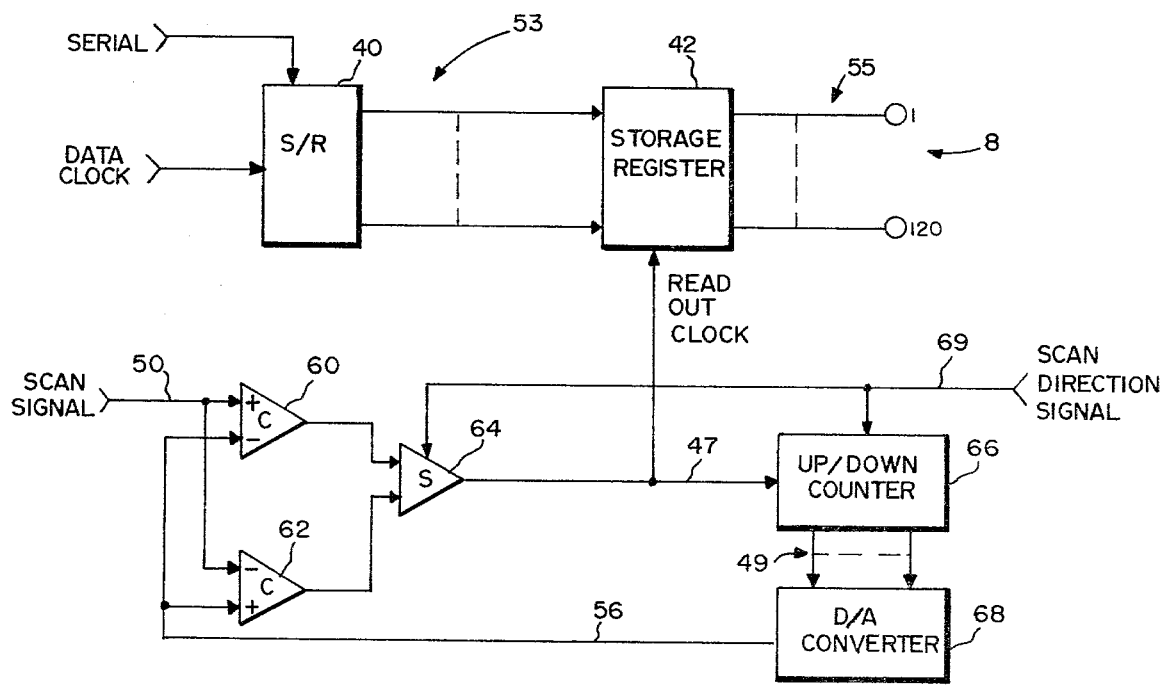
FIG. 6 is a functional block diagram of an alternative circuit for the scan linearization system of the invention responsive to both right and left scan signals.

The system as described in FIG. 5 illuminates the vertical array 8 only during alternate scans, for example, left to right only. Turning now to FIG. 6, a block diagram of the circuit of FIG. 5 modified to be operative for both left to right and right to left scan is shown. The shift register 40 and storage register 42 portions of this implementation are the same as for the alternate frame version. Here, two comparators 60 and 62, are provided with the scan signal applied via lead 50 to the + input of comparator 60 and to the − input of comparator 62. An up-down counter 66 is utilized and is clocked over lead 47 via binary switch 64. Binary switch 64 is controlled by a scan direction signal on lead 69 which originates in scan waveform pickoff 23. The scan direction signal may be, for example, a +1 for a left-to-right scan and a −1 for a right-to-left scan. When switch 64 is set for a left-to-right scan, comparator 60 is operative to produce counting pulses on lead 47 and counter 66 is controlled to count up as previously described with reference to counter 46. When the scan direction is reversed, switch 64 connects the output of comparator 62 to lead 47 and reverses counter 66 to cause it to count down. Therefore, counter 66 will not reset but will count down from 239 to 0 and the output of D/A converter 68 on lead 56 will appear as a decending staircase waveform. This approach provides greater vertical resolution of the symbols due to the scan mirror interlace.

As may now be understood, the invention in its broadest aspect is applicable to systems for producing graphic images by means of a multiplicity of sequential lines, in which such systems have nonlinear scanning elements for production of the lines and in which an electrical scanning signal is generated having such nonlinearities in its waveform. When used in such a system, the invention serves to produce linearized and undistorted graphic images. What is considered the invention therefore is a method and apparatus for:

1. quantizing the scanning lines into a selected number of discrete elements,
2. producing a staircase waveform signal in which the amplitudes or heights of all steps are equal and the number of steps is equal to the number of discrete elements,
3. comparing the staircase waveform signal to the scanning signal,
4. producing a step when the amplitude of the scanning signal exceeds the amplitude of an existing step, thus controlling the temporal spacing between steps to be complementary to the nonlinearities of the scanning signal, and
5. introducing image defining signals in the system at the time that each step is produced whereby the resultant graphic image produced by the system is undistorted.

A scan linearization system has been disclosed for use with a prior art system which produces visible images from radiant energy in the infrared regions. The invention permits external data to be entered into the system so as to produce visible overlays of the IR image in the form of symbols, characters, lines and the like. The invention permits such externally introduced signals to be timed so as to compensate for irregularities, jitter, nonlinearities and distortions inherent in the image system scanning elements to thereby produce clear, sharp, and undistorted superimposed images. Although specific circuits have been shown for implementing the invention, many changes and modifications may be made which will be obvious to those skilled in the art without departing from the spirit and scope of the invention.

I claim:

1. In a system for producing graphic images by means of a nonlinear scanning element which scans a multiplicity of scanning lines, apparatus for compensating for scanning nonlinearities comprising:
    means for quantizing the scanning lines into a selected number of discrete image elements;
    staircase waveform generation means for producing an electrical staircase waveform having equal amplitude steps equal in number to the selected number of image elements;
    staircase waveform control means connected to said staircase waveform generation means for controlling the temporal spacing between said amplitude steps to be complementary to the scanning nonlinearities; and
    signal introducing means associated with said quantizing means and said staircase waveform control means and responsive to each successive one of said amplitude steps to introduce image-defining signals into the system whereby graphic images produced by the system in response to said image-defining signals are undistorted.

2. In a night imaging system having a nonlinear optical scanning subsystem which scans a plurality of modulated emitters, the scanning subsystem including a scan waveform pickoff, a device for introducing external electrical signals into the emitters comprising:
    storage means for receiving and storing sequential groups of externally generated image-defining signals;
    staircase waveform generation means for producing a waveform having equal amplitude steps; and
    staircase waveform control means connected to said staircase generation means for controlling the temporal spacing between said amplitude steps, said control means responsive to the scan waveform from the scan waveform pickoff, said staircase waveform control means connected to said storage means and adapted to produce a readout clock signal at the time of each amplitude step of said waveform generation means for reading out a group of such stored image-defining signals from said storage means to modulate the emitters thereby linearizing the image produced on the imaging system by scanning of the externally modulated emitters by said nonlinear optical scanning subsystem.

3. The device as defined in claim 2 in which said storage means comprises:
    data clock means operating at a rate very high with respect to the scan rate of the scanning subsystem;
    shift register means connected to said data clock means for receiving a group of such image-defining signals at the rate of said data clock; and
    storage register means connected to said shift register means for storing the group of received image defining signals in parallel, said storage register means connected to the plurality of emitters and responsive to said readout clock signals to read out the stored signals in parallel to the emitters.

4. The device as defined in claim 3 in which said staircase waveform control means comprises:
    comparator means connected to the scanning subsystem and to said staircase waveform generation means for producing said readout clock signal when the scan waveform amplitude exceeds the amplitude of the staircase waveform.

5. The device as defined in claim 4 in which said staircase waveform generation means comprises:
    up-counter connected to said comparator means for counting to a preselected number responsive to a sequence of readout clock signals; and
    digital-to-analog converter connected to said up-counter for producing signals having amplitudes proportional to the instantaneous count of said up-counter, a sequence of such signals thereby producing the staircase waveform.

6. The device as defined in claim 5 in which said up-counter is connected to the scan waveform pickoff for receiving a scan direction signal therefrom and responsive to said scan direction signal to reset said up-counter when the preselected number is reached.

7. The device as defined in claim 4 in which said staircase waveform generation means comprises:

up-down-counter connected to said comparator means for counting to a preselected number responsive to a sequence of readout clock signals; and digital-to-analog converter connected to said up-down-counter for producing signals with amplitudes proportional to the instantaneous count of said up-down-counter, a sequence of such signals thereby producing the staircase waveform.

8. The device as defined in claim 7 in which said staircase waveform generation means includes means for alternating the direction of counting of said up-down counter in response to said scan direction signal.

9. The device as defined in claim 8 in which said comparator means includes:
  a pair of comparators with inputs connected in parallel with opposite input polarities; and
  switch means connected to receive the scan direction signal and adapted to alternately connect said up-down counter to one of said pair of comparators responsive to said scan direction signal.

10. A device for synchronizing the external input of digitally coded symbols to a plurality of emitters being modulated by radiant energy images in a system in which the plurality of emitters is scanned by a nonlinear optical scanning system producing visible images defined by the radiant energy, the scanning system including a scan waveform pickup, comprising:
  a source of serial digital data representative of a selected symbol;
  a shift register connected to receive groups of the serial digital data from said source;
  a storage register connected in parallel to said shift register for storing in parallel the serial digital data received by said shift register, said storage register having parallel output connected to the plurality of emitters;
  a staircase threshold waveform generator having equal amplitude voltage steps and a variable time duration of such steps; and
  a comparator connected to the scan waveform pickup, to said storage register, and to said staircase threshold waveform generator for producing a readout signal when the amplitude of a scan waveform from the scan waveform pickup exceeds the amplitude of the staircase threshold waveform, such readout signals producing the variable time duration of the staircase waveform steps and causing the digital data stored in said register to modulate the plurality of emitters in parallel, whereby the variable time duration of such readout signals compensates for the nonlinearities of the nonlinear optical scanning system to thereby produce an undistorted visible image of the selected symbol superimposed on the visible images defined by the radiant energy.

11. The device as defined in claim 10 in which said shift register includes data clock generation means producing a clock rate very much greater than the rate of optical scanning, the clock from said data clock generation means controlling a group of serial digital data to be read into said shift register at the time the readout signal occurs.

12. In a system having nonlinear scanning elements that produce graphic images by means of a multiplicity of sequential scanning lines and in which an electrical scanning signal having such nonlinearities in its waveform is available, the method of producing linearized and undistorted images comprising the steps of:
  quantizing each scanning line into a selected number of discrete elements;
  producing a staircase waveform signal in which the amplitudes of the steps are equal and the number of steps is equal to the selected number of discrete elements;
  comparing the staircase waveform signal to the scanning signal;
  producing a step in the staircase waveform signal when the amplitude of the scanning signal exceeds the amplitude of an existing step thus controlling the temporal spacing between steps to be complementary to the nonlinearities of the scanning signal; and
  introducing image-defining signals into the system at the time that each step is produced whereby the resultant graphic image produced by the system is undistorted.

* * * * *